United States Patent [19]

Park

[11] Patent Number: 5,102,084

[45] Date of Patent: Apr. 7, 1992

[54] POSITIONING APPARATUS WITH GEARS AND A PIVOT FOR ANGULARLY AND LONGITUDINALLY POSITIONING THE SCREEN OF A LAP TOP COMPUTER

[75] Inventor: Kyung Park, Kyungki, Rep. of Korea

[73] Assignee: Hyundai Electronics Ind. Co., Ltd., Kyongg, Rep. of Korea

[21] Appl. No.: 598,230

[22] Filed: Oct. 16, 1990

[30] Foreign Application Priority Data

Oct. 16, 1989 [KR] Rep. of Korea ............... 14850/89

[51] Int. Cl.[5] .................. E04G 3/16; E05D 7/084; H05K 7/16
[52] U.S. Cl. .................................. 248/286; 248/918; 16/338; 16/354; 361/393
[58] Field of Search ............... 248/918, 286; 16/337, 16/338, 342, 354; 361/380, 392, 393, 394, 395, 399; 364/708

[56] References Cited

U.S. PATENT DOCUMENTS

| 1,638,065 | 8/1927 | Simon | 16/338 |
| 2,959,808 | 11/1960 | Limberg | 16/354 |
| 3,422,487 | 1/1969 | Dickinson et al. | 16/354 |
| 4,630,333 | 12/1986 | Vickens | 16/338 |
| 4,765,027 | 8/1988 | Andric | 16/354 |
| 4,852,032 | 7/1989 | Matsuda et al. | 364/708 |
| 4,946,300 | 8/1990 | Makita | 400/682 |
| 4,960,256 | 10/1990 | Chihara et al. | 248/248 |
| 4,979,265 | 12/1990 | Grass | 16/354 X |

FOREIGN PATENT DOCUMENTS

| 908230 | 4/1954 | Fed. Rep. of Germany | 16/338 |
| 1559893 | 6/1978 | Fed. Rep. of Germany | 16/354 |
| 61-19831 | 2/1986 | Japan . | |
| 62-89023 | 6/1987 | Japan . | |
| 62-96730 | 6/1987 | Japan . | |
| 63-151032 | 10/1988 | Japan . | |
| 63-199321 | 12/1988 | Japan . | |
| 64-54121 | 4/1989 | Japan . | |
| 64-54125 | 4/1989 | Japan . | |
| 1-61722 | 4/1989 | Japan . | |
| 1-68520 | 5/1989 | Japan . | |

Primary Examiner—Leo P. Picard
Assistant Examiner—Michael W. Phillips
Attorney, Agent, or Firm—Burns, Doane, Swecker & Mathis

[57] ABSTRACT

A combination LCD screen and keyboard cover of a lap top computer is hinged to a main or keyboard body. The combination cover is used as either an LCD screen when opened or a keyboard cover when closed. The LCD screen is fixed to the inner face of the combination cover. The combination cover has a tilt adjusting apparatus for adjusting the screen viewing angle of the LCD screen. The tilt-adjusting apparatus comprises a pair of bracings which extends from one side of the combination cover and is hinged to a housing by hinge shafts. A pair of racks are longitudinally fixed to the rear wall of the housing and a mating pair of pinions are fixedly mounted on pinion shafts. Driving gears are fixedly mounted on the hinge shafts for rotating the pinions in the same direction through idle gears and transmission gears. Friction bands are wound around one cylindrical end of the hinge shafts in order to hold the tilt combination cover in place.

7 Claims, 6 Drawing Sheets

POSITIONING APPARATUS WITH GEARS AND A PIVOT FOR ANGULARLY AND LONGITUDINALLY POSITIONING THE SCREEN OF A LAP TOP COMPUTER

BACKGROUND OF THE INVENTION

This invention relates to a positioning apparatus and more particularly to the combination LCD screen and keyboard cover (hereinafter referred to as combination keyboard cover) of a lap top computer with a tilt-angle adjusting apparatus for adjusting the degree of the tilt.

Normally, the prior art lap top computer as shown in FIG. 6, comprises the combination keyboard cover 3 which is hinged to the main body 1. An LCD screen 4 is fixed to the inner face of the combination keyboard cover 3. The combination keyboard cover 3 can be used as either an LCD screen when opened or a keyboard cover when closed.

In using the combination keyboard cover of a lap top computer, it becomes more essential that an operator is able to alter the viewing angle of the screen surface to obtain the desired angle of tilt on the screen and that the tilt screen be held in the desired position with maximum stability.

In the tilt-angle adjusting apparatus, the prior art lap top computer can have either a tight fit mechanism or a detent mechanism which is built into the computer. In the case of tight fit mechanism, it becomes difficult to manufacture hinge shafts and mating holes which meet the prescribed tolerance limits. Another disadvantage is that the fit between the hinge shafts and mating holes loosens over a long period of use, thus causing the collapse of the combination keyboard cover under its own weight.

On the other hand, while the detent mechanism eliminates the need for a special hinge shaft or a mating hole structure, it has the disadvantage that the elasticity between ratchet and claw descreases over a long period of use, thus preventing the tilt screen from being adjusted in the desired tilt position and held there with stability. Also, the two mechanisms are almost unmendable once they break down.

Another disadvantage is that the prior art lap top computer needs to have a high overall height for facilitating the pivotal movement of the combination cover 4 because the hinge point is constructed to be immovable.

It is the main object of the present invention to provide a pivotable combination LCD screen and keyboard cover which is readily adjustable in position and stably held in place over a long period of use.

It is another object of the present invention to provide a pivotable combination LCD screen and keyboard cover which is simple in construction, low in manufacturing cost and compact in size.

SUMMARY OF THE INVENTION

An LCD screen is fixed to the inner face of the combination keyboard cover. A pair of bracings extend from one side of the combination keyboard cover and are hinged to a housing by a pair of hinge shafts. The housing is incorporated in the main or keyboard body. The pair of hinge shafts are attached to the corresponding bracings. Within the housing is nested a slidable carriage casing. A pair of guides, or grooves extend longitudinally in the inwardly facing walls of the housing and the mating pair of outward protrusions extend from the outwardly facing walls of the slidable carriage casing in order to be slidable within the corresponding guide grooves.

A pair of racks are longitudinally fixed to the rear wall of the housing and mating pair of pinions is mounted on the corresponding hinge shafts which are fixed within the slidable carriage casing in order to engage the corresponding racks. A pair of driving gears are fixedly mounted on the corresponding hinge shafts for rotating the corresponding pinions in the same direction. A friction band is wound on one end of each hinge shafts. One end of each friction band is anchored to the slidable carriage casing.

A pair of transmission gears are fixedly mounted on the corresponding pinion shafts. An idle gear engages each driving and transmission gear causing those gears to rotate in the same direction. The pinion shafts and idle gear shafts are secured within the slidable carriage casing.

The objects and features of the present invention are set forth with particularity in the appended claims. The present invention may be best understood by reference to the following description, taken in connection with the accompanying drawings in which like numerals indicate like parts.

DETAILED DESCRIPTION OF THE INVENTION

Figure 1:
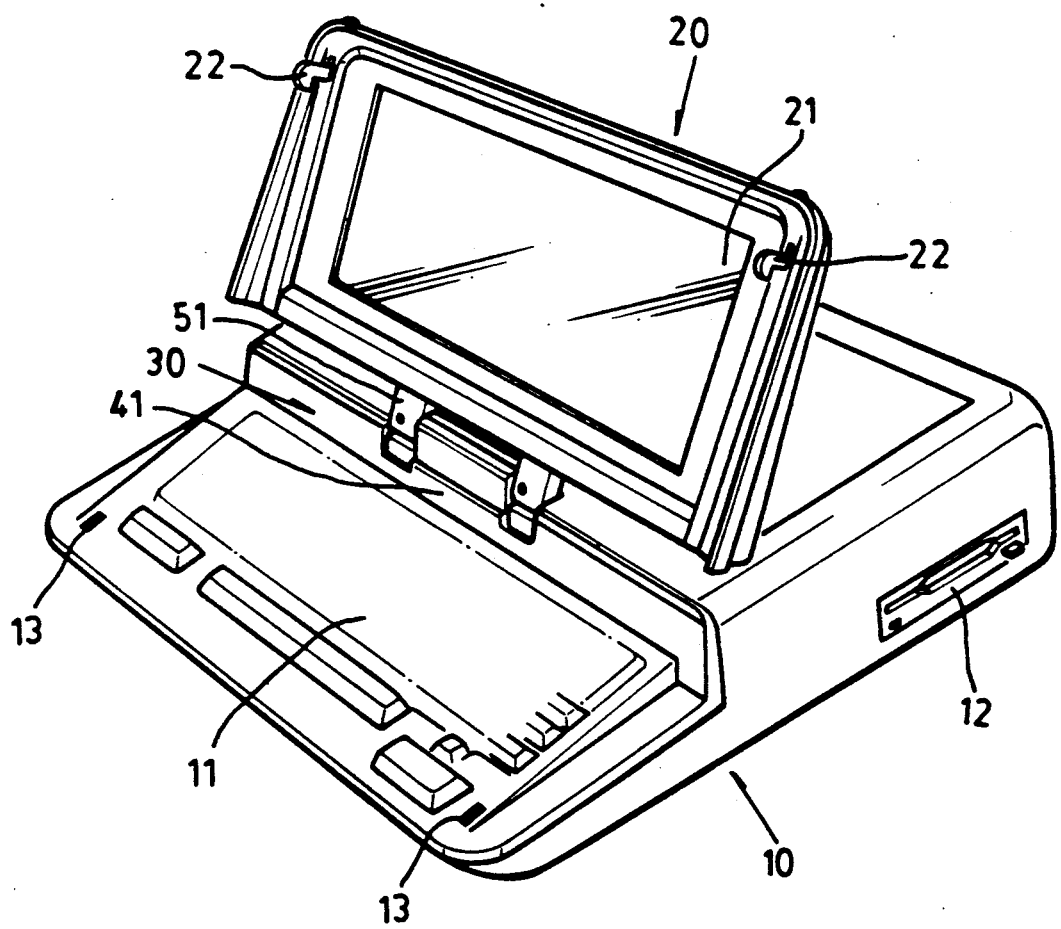
FIG. 1 is a perspective view of the combination LCD screen and keyboard cover of the present invention in open position as utilized with a lap top computer.

Referring to the drawings, there is shown a lap top computer comprising a mainbody 10. The main body 10 has a floppy disk drive 12 mounted to one portion of the computer and a keyboard 11 fixedly mounted to the upper front face.

A liquid crystal display (LCD) screen 21 is fixedly mounted to the inner face of a combination screen and keyboard cover 20 (hereinafter referred to as a combination keyboard cover). A pair of hollow brace members 51 are extended from one side of the combination keyboard cover 20 and pivotally secured to a housing 31 by a pair of hollow hinge shafts 61. Latch pawls 22 are provided opposite portions of the combination cover 20 and received through slot openings 13, respectively when the combination keyboard cover 20 is in its closed position with respect to the keyboard 11. The configuration of the keyboard 11 and of the combination keyboard cover 20 is designed in such a manner that in the closed position, the combination keyboard cover 20 is in close proximity to, but not in contact with the keyboard 11 (see FIG. 3A).

The housing 31 is integrally formed with the main body 10 and has a pair of longitudinally extending grooves 32 formed in the inwardly facing opposite side walls. The channeled portions of the grooves 32 face in an inward direction toward the center. Mounted within the housing is nested or arranged a slidable carriage casing 41 which has matching protrusions 42 extending outwardly from the outwardly facing opposite side walls thereof for slidably riding in the channel grooves 32.

Figure 2:
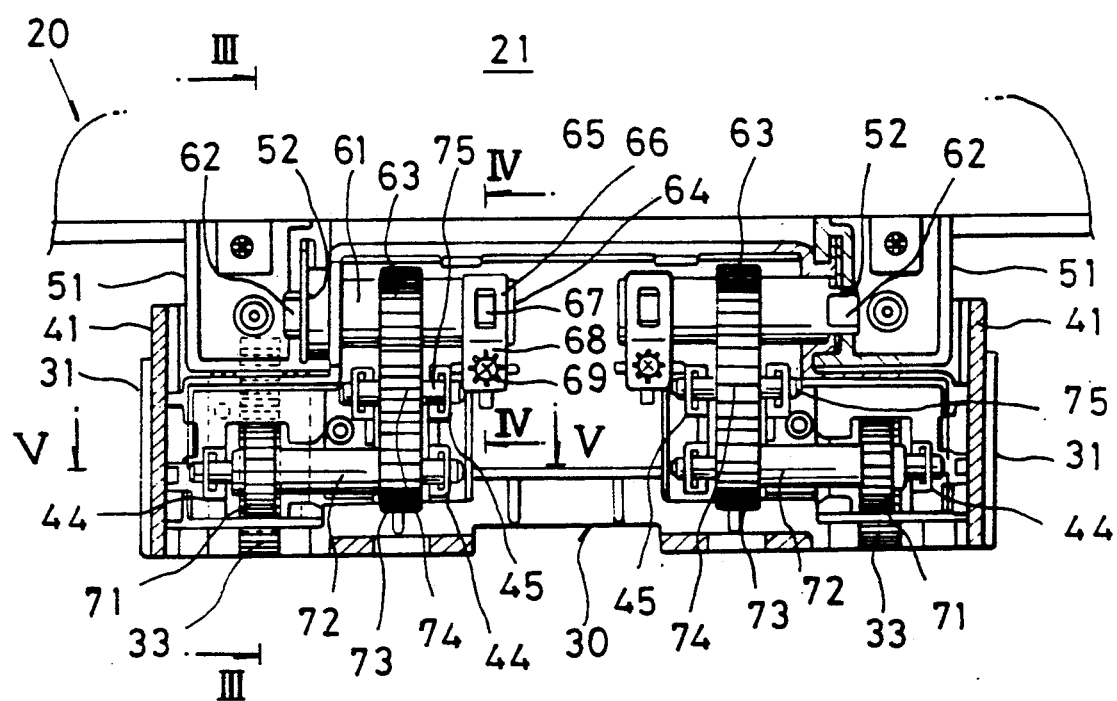
FIG. 2 is an enlarged longitudinal sectional view of part of the combination LCD screen and keyboard cover of FIG. 1.

In detail, each hollow hinge shaft 61 has a non-circular spigot 62 with one end received in a matching angular recess 52 formed in the inner face of the corresponding brace members 51. The other cylindrical end of each hinge shaft 61 is circular in cross section and is positioned horizontally within the convex-shaped portion of the slidable carriage casing 41 (see FIG. 2). The particular spatial configuration of each spigot 62 an of its matching recess 52 embodied in the herein described preferred embodiment can be readily varied without departing from the spirit of the present invention. With this arrangement, the hollow hinge shafts 61 can be moved up and down simultaneously with the combination keyboard cover 20.

Figure 5:
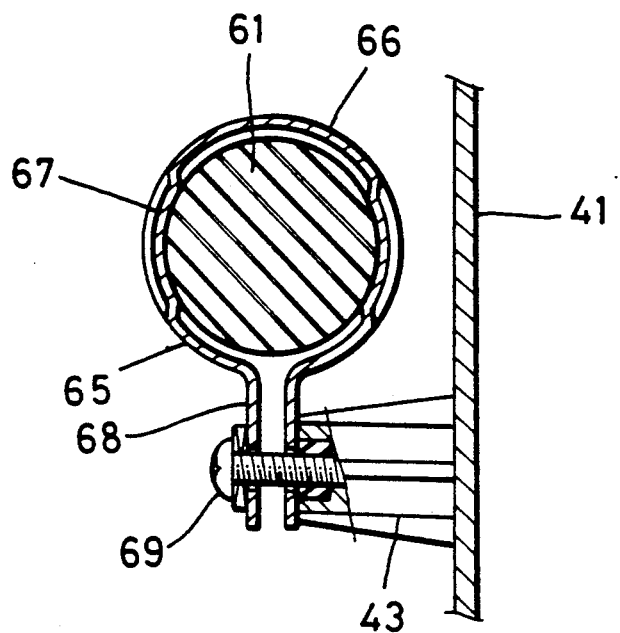
FIG. 5 is a sectional view taken on line V—V of FIG. 2.
Figure 4:
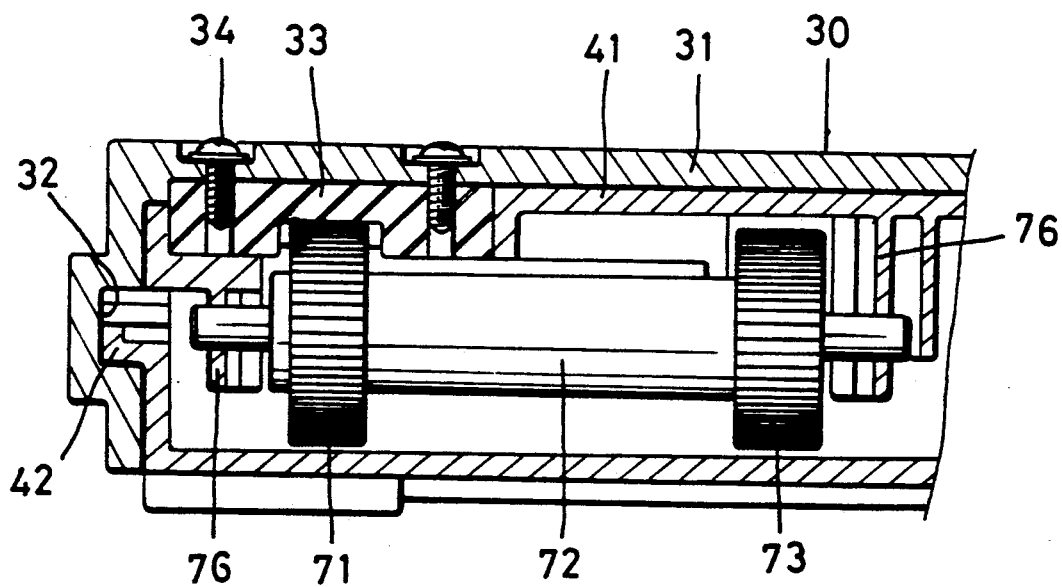
FIG. 4 is a sectional view taken on line IV—IV of FIG. 2.
Figure 6:
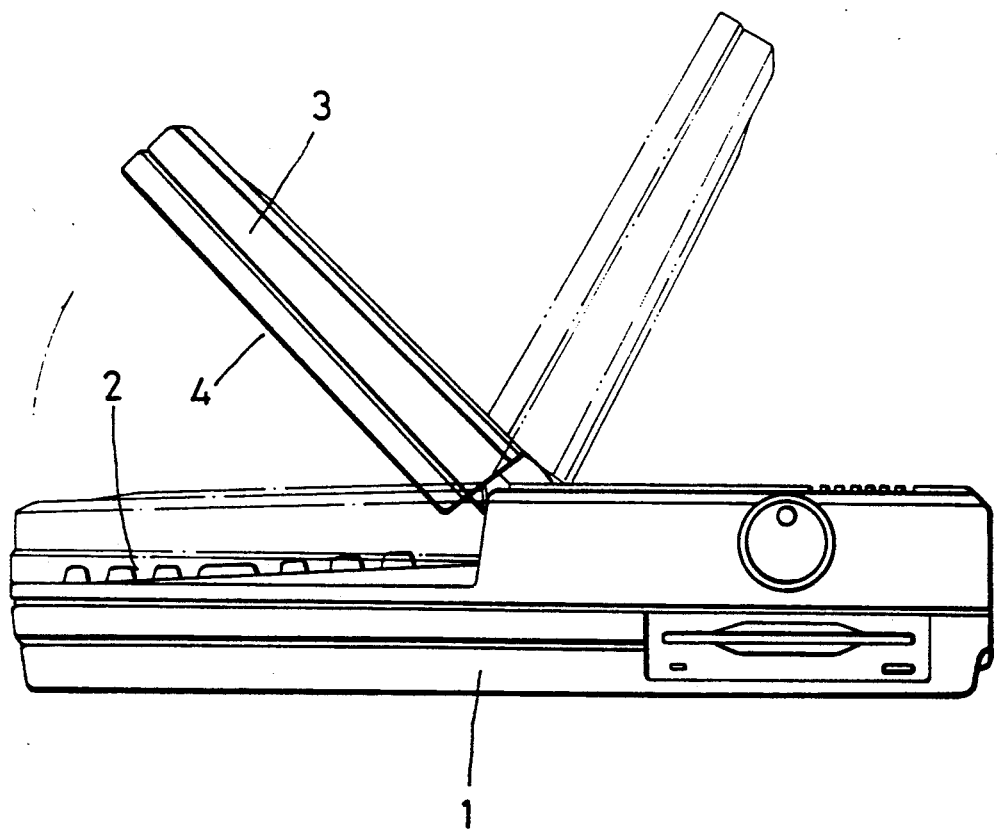

As particularly shown in FIG. 5, a friction band 65 is closely wound around the cylindrical end 64 of each hollow hinge shaft 61. The friction bank 65 is constructed to have two sections, i.e., a wound friction section 66 and an extended straight section 68. The extended straight section 68 is releasably anchored at a boss 43 by means of screw 68 within the slidable carriage casing 41. With this arrangement, the frictional force between the cylindrical end 64 of the hollow hinge members 61 and the frictional band 65 can be adjusted by releasing or fastening each screw 69.

It is within the scope of the present invention that each wound section 66 of ech friction bank 65 is constructed to have resilient or frictional contact sections 67, arranged alternately with spaced sections so as to stick fast to the circular section end 64 of each hollow hinge shaft 61.

Each hollow hinge shaft 61 contain an electric wire (not shown) with one end connected to the display screen 21 through the hollow brace 51 and the other end, to the main body 10 through the slidable carriage casing 41.

A driving gear 63 is fixedly mounted on the mid-portion of the corresponding hinge shafts 61. Opposite to and parallel with each hinge shaft 61 is a horizontal shaft 72 which is secured at 44 within the slidable carriage casing 41.

The horizontal shaft 72 has a transmission gear 73 and a pinion 71 mounted on both end respectively. Parallel with and between each hinge shaft 61 and the horizontal shaft 72 is provided an idle gear shaft 75 which is rotatably secured at 45 within the carriage casing 41. An idle gear 74 is mounted on the mid-portion of the idle gear shaft 75 in alignment with and contact with the driving and transmission gears 63 and 73. With this arrangement, the driving gear 63 and the pinion 71 can be rotated in the same direction.

Figure 3A:
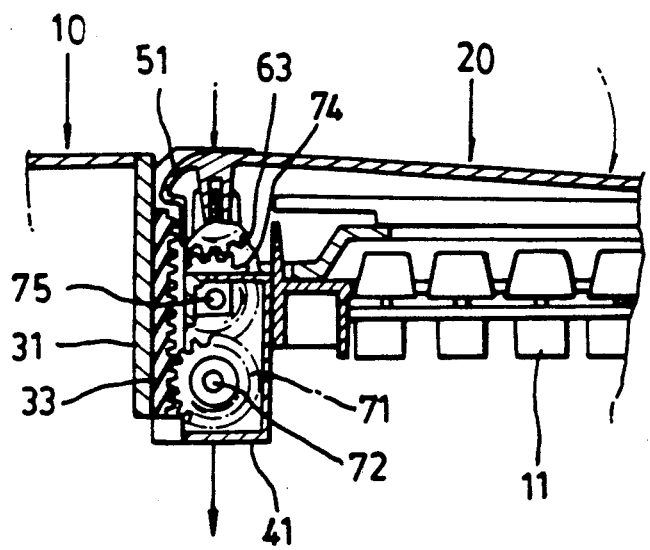
FIG. 3A is a sectional view taken on line III—III of FIG. 2 with the combination cover of the present invention shown in closed position.
Figure 3B:
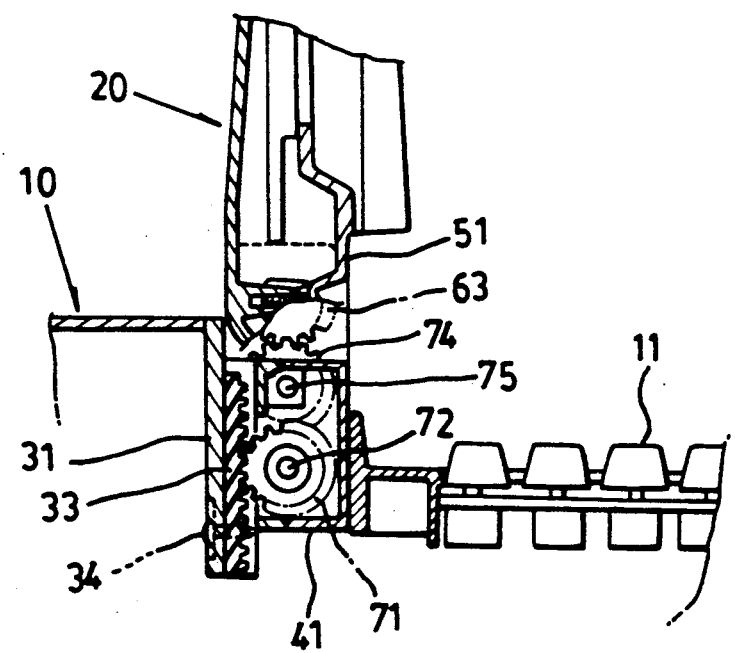
FIG. 3B is similar to FIG. 3A, but showing the combination cover of the present invention in an upright position perpendicular to the plane generally defined by keyboard.
Figure 3C:
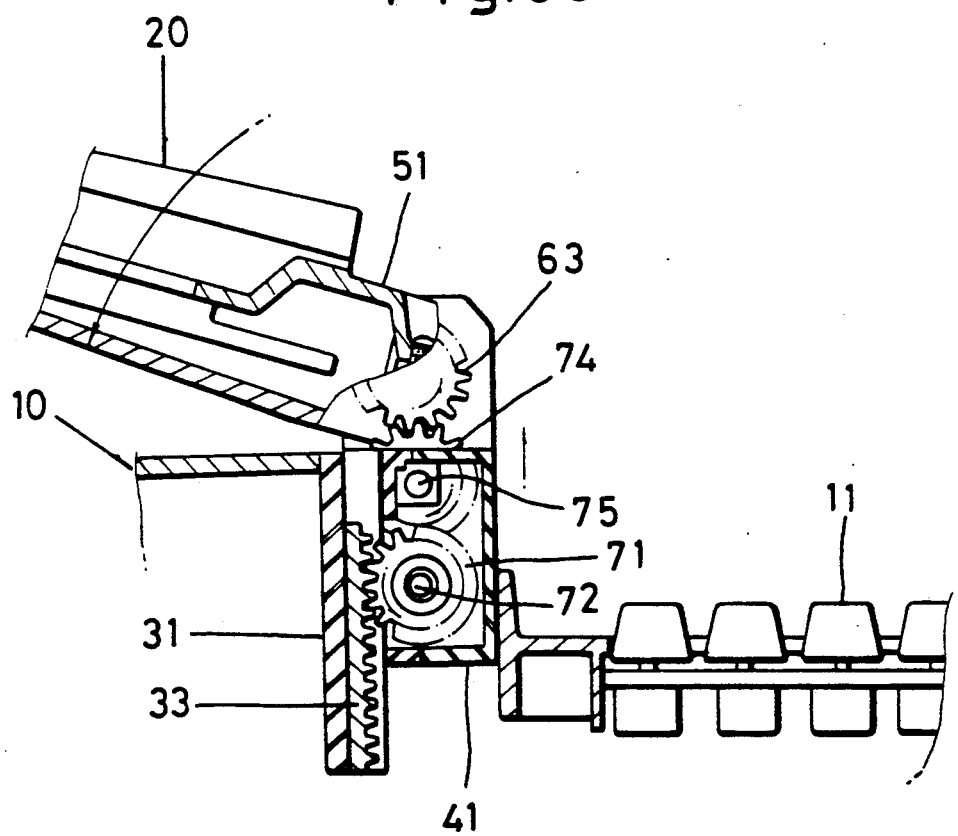
FIG. 3C is similar to FIG. 3A, but showing the combination cover of the present invention in an obtuse angular position to the plane generally defined by the keyboard.

As shown in FIGS. 3A, 3B and 3C racks 33 are fixed to the rear wall of the housing 31 by means of screws 34 for meshing with the corresponding pinions 71. The housing 31, slidable carriage casing 41 and hollow bracing members 51 constitute the tilt-angle adjusting apparatus 30 of this invention.

With reference to FIGS. 1 through 5, the combination screen and keyboard cover 20 of the operation of the present invention will now be discussed. To move the combination cover 20 from the position as shown in FIG. 3A to those shown in FIGS. 3B or 3C, the combination cover 20 is opened by moving about the hinge shafts 61, thereby effecting the upward movement of the hinge shafts 61. Simultaneous with this movement of the hinge shafts 61, the driving gears 63 are rotated counterclockwise (as depicted in FIGS. 3B and 3C), whereupon the transmission gears 73 are rotated counterclockwise. Simultaneous with the movement of the transmission gears 73, the pinions 71 are also rotated counterclockwise, thus moving upward along the racks 33, whereupon the outward extensions 42 from the slidable carriage cassing 41 slides upwardly along the matching grooves 32 in the housing 31.

As the combination keyboard cover 20 is opened, the hinge shafts 61 are raised.

It should be noted that when the operator adjusts the combination keyboard cover 20, any inadvertent collapsing of the combination cover 20 is absolutely prevented due to the friction bands 65.

The closing of the combination cover 20 is achieved in a reverse manner by simple pressing the cover 20 downwards. This action will cause the turning of the cover 20 about hinge shafts 63, whereupon the driving gears 63 and pinions 71 will rotate clockwise. It should also be noted that in the closing operation, any inadvertent collapsing of the combination cover 20 is prevented because of the friction force exerted by the friction bands 65. While in accordance with the provisions and statutes there has been illustrated and described the best form of the invention, certain changes may be made without departing from the spirit of the invention as set forth in the appended claims and in some cases, certain features of the invention may be used to advantage without a corresponding use of other features.

What is claimed is:

1. A positioning apparatus for a lap-top computer having a main body with a keyboard and a keyboard cover including a display screen, the keyboard cover being tiltably attached to said main body to move between an open position in which the keyboard is uncovered and a closed position in which the keyboard is covered, said positioning apparatus comprising:

a housing mountable in a lap-top computer main body;

a slidable carriage casing arranged within said housing for longitudinal movement relative to said housing;

a pair of hollow bracings attachable to one side of a lap-top computer keyboard cover and pivotally connected to the upper end of said slidable carriage casing;

a pair of racks longitudinally fixed to the rear wall of said slidable carriage casing;

a pair of pinions mounted on pinion shafts, each pinion meshing with a corresponding one of said racks, said pinion shafts being rotatably mounted within said slidable carriage casing;

a pair of hinge shafts, each hinge shaft having one cylindrical and one non-circular end, each of said non-circular ends attached to a respective one of said hollow bracings, each of said cylindrical ends extending horizontally within said slidable carriage casing;

friction bands wound around each of the cylindrical ends of said hinge shafts and anchored within said slidable carriage casing;

a driving gear fixedly mounted on each of said hinge shafts and rotatably connected with said pinions;

a transmission gear fixedly mounted on each of said pinion shafts in coaxial relationship along the common axis of a corresponding one of said pinions; and an idle gear provided between each of said driving gears and said transmission gears.

2. A positioning apparatus according to claim 1, wherein said pair of hollow bracings and said slidable carriage casing are separately connected with each other.

3. A positioning apparatus according to claim 1, wherein said housing has a longitudinally extending groove formed in at least one inwardly facing side wall thereof and said slidable carriage casing has an outwardly extending protrusion extending from at least one outwardly facing side wall thereof for longitudinal movement with respect to said longitudinally extending groove.

4. A positioning apparatus according to claim 1, wherein one end of each of said hinge shafts has a non-circular shape in order to be inserted into a mating non-circular recess formed in each of said bracings.

5. A positioning apparatus according to claim 1, wherein each of said friction bands comprises a frictional contact section and an extended straight section, said frictional contact section being wound around the cylindrical end of said hinge shaft and said extended straight section being anchored within said slidable carriage casing.

6. A positioning apparatus according to claim 5, wherein said frictional contact section has a spaced section formed therein.

7. A positioning apparatus according to claim 1, wherein each of said pinion shafts and said idle gear shafts are respectively attached to support means which is fixed within said slidable carriage casing.

* * * * *